United States Patent
Janakiraman et al.

(10) Patent No.: US 9,641,462 B2
(45) Date of Patent: May 2, 2017

(54) ACCELERATING NETWORK CONVERGENCE FOR LAYER 3 ROAMS IN A NEXT GENERATION NETWORK CLOSET CAMPUS

(71) Applicant: Cisco Technology, Inc., San Jose, CA (US)

(72) Inventors: Rajagopalan Janakiraman, Cupertino, CA (US); Sanjay Kumar Hooda, Cupertino, CA (US); Pags Krishnamoorthy, San Jose, CA (US); Shreeram Bhide, San Jose, CA (US); Sridhar Subramanian, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 871 days.

(21) Appl. No.: 13/868,214

(22) Filed: Apr. 23, 2013

(65) Prior Publication Data

US 2014/0317249 A1   Oct. 23, 2014

(51) Int. Cl.
*G06F 15/177* (2006.01)
*H04L 12/931* (2013.01)
*H04W 40/24* (2009.01)

(52) U.S. Cl.
CPC ............ *H04L 49/65* (2013.01); *H04W 40/24* (2013.01)

(58) Field of Classification Search
None
See application file for complete search history.

(56) References Cited

U.S. PATENT DOCUMENTS

| | | | |
|---|---|---|---|
| 6,944,786 B2* | 9/2005 | Kashyap | G06F 11/20 714/4.4 |
| 8,484,290 B2* | 7/2013 | Mazzaferri | G06F 9/542 709/221 |
| 8,520,595 B2 | 8/2013 | Yadav et al. | |
| 2008/0192668 A1 | 8/2008 | Okubo et al. | |
| 2012/0173694 A1 | 7/2012 | Yan et al. | |
| 2012/0176936 A1 | 7/2012 | Wu et al. | |
| 2012/0201224 A1 | 8/2012 | Wu | |
| 2012/0202502 A1 | 8/2012 | Wu | |
| 2012/0294192 A1* | 11/2012 | Masood | H04L 12/4645 370/255 |

OTHER PUBLICATIONS

International Search Report & Written Opinion cited in International Application No. PCT/US2014/034814 mailed Aug. 25, 2014, 11 pgs.

* cited by examiner

*Primary Examiner* — Jeffrey R Swearingen
(74) *Attorney, Agent, or Firm* — Merchant & Gould P.C.

(57) ABSTRACT

Accelerating network convergence may be provided. Consistent with embodiments of the disclosure, a mapping server may be configured to map an interconnection of various network elements comprising at least the following: a wireless host, at least two access switches, a plurality of distribution switches, a core switch, a mobility controller, and a mapping database. The mapping server may then receive an indication from the mobility controller that the wireless host has roamed from a first access switch to a second access switch. In response to the indication, the mapping server may remap the interconnection of network elements in the mapping database to update network routing information associated with the wireless host.

20 Claims, 4 Drawing Sheets

ACCELERATING NETWORK CONVERGENCE FOR LAYER 3 ROAMS IN A NEXT GENERATION NETWORK CLOSET CAMPUS

BACKGROUND

When a wireless mobile device roams, its connectivity with a wireless router may be impacted due to its change of proximity from the wireless router. At times, the wireless mobile device may come into the signal range of a different wireless router that provides, for example, a stronger wireless signal. In this instance, the wireless mobile device may be configured to disconnect from its initial wireless router and connect to the new wireless router with the stronger signal. During this intermittent disconnection and reconnection phase, there is a need to provide continuous and optimized network connectivity so as not to cause, for example, extraneous latencies in network traffic and additional network bandwidth usage that may result.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Moreover, heading titles are used to improve readability of this disclosure and are not meant to limit the underlying content to a corresponding header title. Accordingly, the following detailed description does not limit the disclosure. Instead, the proper scope of the disclosure is defined by the appended claims.

Overview

The present disclosure solves the problem associated with wireless host roaming. Wireless host roaming may be understood to be when a mobile network host device relocates from the wireless signal range of one wireless access switch, to the wireless signal range of another wireless access switch.

For instance, a wireless host may be provided with connectivity to a network via a first access switch. The first access switch may comprise, for example, a wireless hub which may serve as the network access point for wireless hosts within a first wireless signal range. As the wireless host roams out of the first wireless signal range, the wireless host may enter a second wireless signal range associated with a second access switch. Finding that the second access switch is providing a stronger wireless signal at its location (or, simply loosing connectivity to the first access switch), it may disconnect from the first access switch and reconnect to the network via the second access switch. This process is known as wireless roaming.

During the wireless host's switch from the first access switch to the second access switch, based on the roaming scenario, there may be a period of time in which the wireless host may experience latency in its network connectivity. Furthermore, there may be an excessive bandwidth usage and increased latency for the entire duration of host's connectivity to the second access switch. One skilled in the field of the present disclosure may recognize that the excessive bandwidth usage and increase in latency may be the result of the network infrastructure continuing to anchor the wireless host to its initial access switch, even though the host is no longer attached to the initial access switch. In this scenario, the traffic to the wireless host may be tunneled from this initial switch (e.g., the first access switch) to the new switch (e.g., the second access switch). This may be known as Layer 3 (L3) roam.

In another scenario, to accommodate this wireless roaming, host policies and context may be transferred to the new access switch. In this way, the new access switch may take over as the anchor for the wireless host. This may be known as a Layer 2 (L2) roam. While it is desirable to use a Layer 2 roaming scenario, as one of ordinary skill in the field of the present disclosure would recognize, there may be a number of challenges with the aforementioned mobility handoffs.

Firstly, to transfer the host policies to the new access switch, the policies may first need to be fetched from a server comprising those policies and subsequently authenticated. In addition, the connection states of certain applications (e.g., a firewall) and other dynamic data may need to be transferred to the new access switch as well. In order to allow latency sensitive application, such as, for example, voice over internet protocol (VOIP) to continue without performance degradation, these transfers would need to be performed within a short time interval.

Secondly, the network between the access, distribution and core layers may need to be reconfigured to support this mobility handoff. In the typical campus network deployment, each access switch may be assigned to a different VLAN (or, in some instances, a few VLANs) in order to, for example, have a contained broadcast domain. In this topology, a wireless roam to another access switch may essentially be a roam across a VLAN (or subnet).

For a seamless roam in this topology, the IP address of the roaming wireless host may be need to be carried over from the previous subnet (or previous VLAN) to the new subnet (or new VLAN) associated with the new access switch. However, since the host's IP address continues to be tied to the previous subnet and may not available to the new access switch, network traffic destined to the wireless host cannot be forwarded down to the new access switch from the core and distribution layer switches associated with the new subnet.

Instead, traffic to the wireless host may need to be forwarded to the previous access switch and then tunneled from the previous access switch to the new access switch (through, for example, 802.2 Control and Provisioning of Wireless Access Points (CAPWAP)). This process may often be referred to as "traffic hair pinning" due to its resultant increased latency and bandwidth usage.

One solution may be to move the routing boundary down to an access layer of the network infrastructure to create an "IP Everywhere" topology. This restructuring of the access layer switch may be complicated and, thus, less scalable. Another solution is to extend the VLAN to other access switches within the mobility roaming domain, so that the roaming of the wireless host remains within the VLAN network no matter where roaming occurs. Such VLAN extension may result in an expanded broadcast domain, requiring an L2 extension all the way from the access layer to the core layer. Consequently, this solution would make the L2 domain very large and, as in the "IP Everywhere" topology, less scalable.

In current Next Generation Wiring Closet (NGWC) mobility architecture, when a wireless host roams, an L2 mobility handoff process is initiated from the new access switch using, for example, a NGWC Mobility Control Protocol. This protocol involves a Mobility Controller (MC) device that gathers information related to the wireless host's latest coordinates. The latest coordinates may be stored in terms of the identity of the access switch to which the wireless host is connected and the identity of the corresponding VLAN associated with the access switch.

The MC, however, is decoupled from the network infrastructure's distribution and core switches, which control the network traffic routing to the wireless host via the access switch. In turn, distribution and core layer switches are not visible to the MC and, therefore, the Mobility Controller cannot communicate information regarding the distribution and core switches. As a result, the traditional NGWC mobility architecture, even when coupled with the MC, may still lack an efficient way of, for example, timely rerouting network traffic at the distribution and core layer so as to accommodate for wireless host roaming, and the "traffic hair pinning" problem remains an issue.

Embodiments of the present disclosure address the "traffic hair pinning" problem by accelerating network convergence for L3 roams by integrating current NGWC mobility events with a campus LISP architecture. Such integration may comprise a tie in between the {Wireless Host—Access Switch—VLAN} binding and the {Access Switch—Distribution/L3 Gateway Switch} binding. With this tie, embodiments of the present disclosure may have the visibility of an entire network and the capability to resolve a wireless host roam to the nearest distribution switch without the "traffic hair pinning" associated with previous solutions.

As will be described in detail below, embodiments of the disclosure may employ a LISP map server consistent with the LISP architecture (including a Mobility Controller) to track the location of wireless hosts. The LISP map server may comprise a database of network elements (core switches, distribution switches, access switches, and wireless hosts) and be updated based, at least in part, on the mobility events associated with the NGWC Mobility Control Protocol. In this way, the LISP map server may remain up-to-date with the location of roaming wireless hosts from the MC. With the information from the MC, the LISP map server can quickly and optimally relay control information to the underlying distributions switches across VLAN boundaries, thereby minimizing the latencies and delays associated with the "traffic hair pinning" problem.

Campus LISP Architecture

Figure 1:
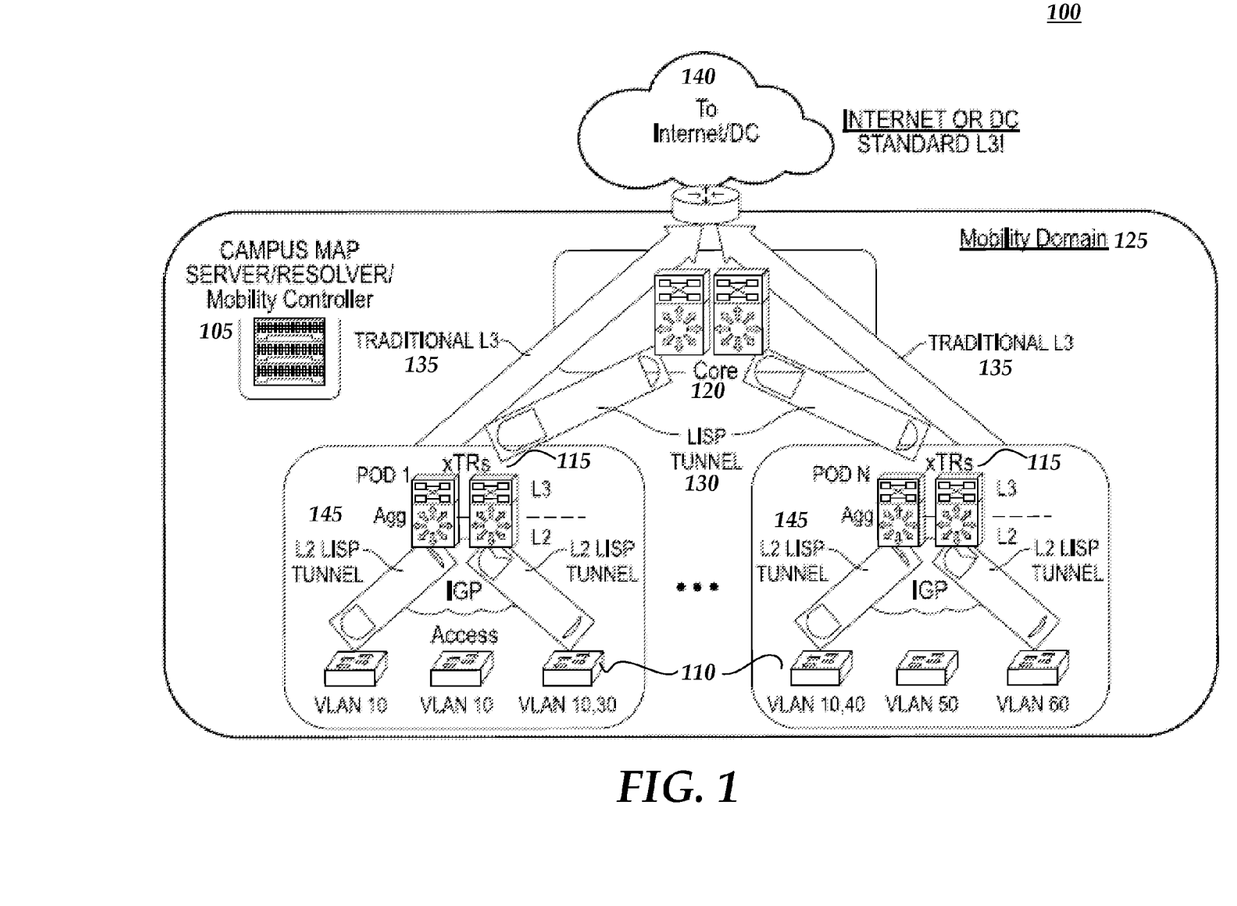
FIG. 1 is a diagram of a Campus LISP architecture.

FIG. 1 illustrates one embodiment of a campus LISP architecture 100. Campus LISP architecture 100 may comprise a NGWC Mobility Controller integrated with LISP map server 105 having functional components in access switches 110, distribution switches 115, and core switches 120 of a mobility domain 125. Distribution switches 115 and core switches 120 may be seen within map server 105 as LISP xTRs (the term xTR refers to a LISP router that functions both as an ingress tunnel router (ITR) and an egress tunnel router (ETR)). Campus hosts, wired or wireless, may be seen as LISP Endpoints having Endpoint IDs (EIDs) within the Campus LISP map server 105. The EIDs may be used by the MC integrated with map server 105 to track the location of hosts behind one of the LISP xTRs (e.g., distribution switches 115). The VLAN and switch virtual interface (SVI) boundary may reside in the distribution layer of campus LISP architecture 100.

Current LISP architectures may support two types of end hosts and represent them with Static EIDs and Dynamic EIDs. For example, in a Static EID implementation, LISP routes may be in a LISP router with subnet masks indicating the Static EIDs. In a Dynamic EID implementation, LISP routes track the hosts and may be learned from the ingression of network packets on a LISP router enabled with Dynamic EID configuration. This is a typical scenario for tracking wired virtual machine mobility. Embodiments of the present disclosure propose a third end host compatibility in the campus LISP architecture 100—a wireless EID comprising a wireless host IP and wireless host MAC address information—will be described in detail with reference to FIG. 2.

Consistent with embodiments of the disclosure, IP network traffic destined to campus hosts may be communicated using a LISP protocol 130 in core-to-distribution communication (a North to South flow) and distribution-to-distribution (an East to West flow) communication. Traditional L3 protocols 135 may be used in distribution switch 115 for north bound traffic destined to Internet and other external destinations 140 such as, for example, a data center. Core switches 120 may perform routing using traditional L3 protocols 135 for north bound traffic and use LISP protocol 130 to forward south bound traffic towards one of the Distribution switches 115.

For switching non-IP traffic within a VLAN across distribution switches 115, a L2 LISP protocol 145 may be used to carry an L2 network frame from one distribution switch to another. Campus LISP architecture 100 may have dataplane, platform enhancements in this distribution layer to achieve good load balancing, failover handling, loop prevention and achieve similar functionality as other spanning tree replacement protocols like TRILL/FabricPath for the campus topology.

Access switches 110 may also operate within L2 of the architecture 100, forwarding upstream traffic with L2 LISP protocol 145 and terminating in one of the attached distribution switches 115. In various embodiments of the present disclosure, access switches 110 may not need to implement LISP control plane functionality and, thus, may not need additions to the existing L3 routing protocols or other control planes.

The functions of distribution switches 115 may include, but not be limited to, for example, LISP encapsulation and decapsulation services for traffic destined to and from campus hosts, LISP dynamic EID detection on access facing links, map-server control plane interaction, and intelligent proxy and gratuitous address resolution protocol (ARP) services for mobility, and L2 segmentation. Other common Distribution-Core layer functions may be retained within campus LISP architecture 100. In summary, embodiments of the present disclosure may use L3 fabric across all layers and one overlay, which is LISP, to address both mobility and L2 extension.

Host Mobility within the LISP Architecture

Figure 2:
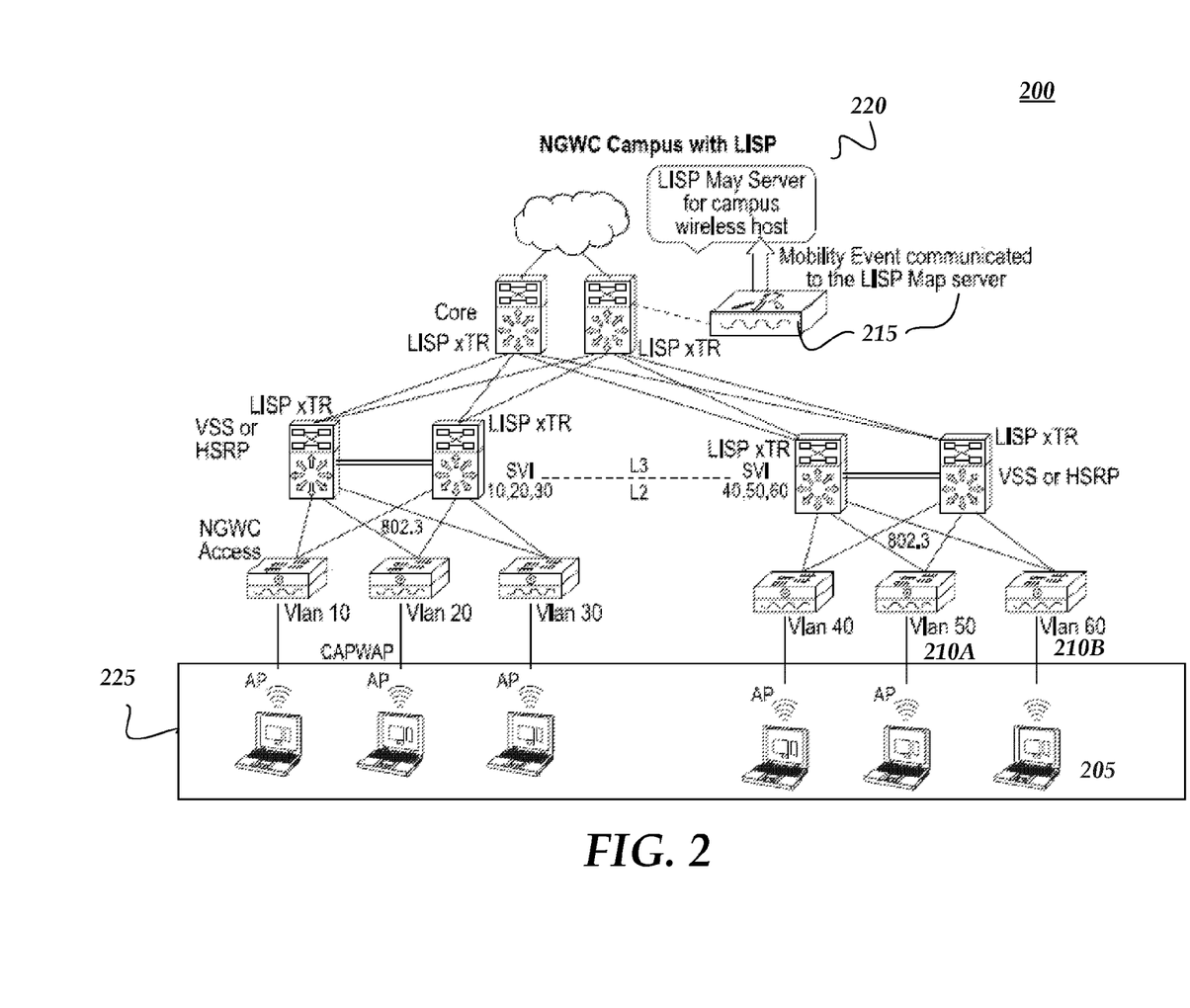
FIG. 2 is a diagram of a campus LISP architecture integrated in a NGWC.

FIG. 2 illustrates an NGWC campus integrated with campus LISP architecture 200. As mentioned above, in current NGWC mobility architecture, when a wireless host 205 (e.g., a mobile computing device) roams from a first wireless router (i.e., access switch 210a) to a second wireless router (i.e., access switch 210b), an L2 mobility handoff process may be initiated from the second wireless router using, for example, a NGWC Mobility Control Protocol. Mobility Controller (MC) 215 may detect wireless host's 205 roam from the first wireless router to the second wireless router and rely information related to wireless host 205's latest coordinates to LISP Map Server 220.

The information may be relayed by MC 215 as, for example, a Mobility Announce message. Map server 220 may, in turn, use the message to track wireless host 205. The Mobility Announce message may comprise, but not be limited to, for example, host 205's MAC address and IP address, as well as VLAN and IP address information associated with the second wireless router. This information may be presented as, for example, a {Host MAC, Host IP, Host VLAN, and Access-Switch IP} binding in LISP architecture 100. In various embodiments, MC 215 may comprise a Mobility Oracle and LISP map server 220 may be integrated with a Mobility Oracle database.

LISP map server 220 is then configured to determine which distribution switches 115 are tied to the access switch 210b in order to form a {distribution switch—access switch} binding. Consistent with embodiments of the present disclosure, LISP map server 220 may learn of wireless host 205's identity and the immediate network attachment (access switch 210b) from MC 215 through, for example, the Mobility Announce message.

In the scenario where access switches 110 are configured as static EIDs, LISP map server 220 may look up an access switch IP in an EID database, fetch corresponding distribution switches tied to the access switch, and associate a wireless EID of wireless host 205 with those corresponding distribution switches in the {distribution switch—access switch} binding. Alternatively, where access switches 110 are configured using dynamic EIDs, the {distribution switch—access switch} binding may be created based on an analysis of packets originating from access switch 210b. In this scenario, the same technique may be used to search the EID database to associate wireless host 205 with corresponding distribution switches. In various embodiments, this {distribution switch—access switch} binding formation process may be performed recursively for each distribution switch in communication with wireless host 205.

Once LISP map-server forms the {Wireless Host—Access Switch—VLAN} binding, gets updated with the wireless EID, and forms the {distribution switch—access switch} binding, it cleans up previous distribution switch routing entries and configures the new distribution switches with wireless host 205 route updates pointing to the VLAN associated with access switch 210b. In various embodiments, the LISP map server 220 may push the LISP route updates to core switches 120.

In addition, the route updates may be pushed to other distribution switches selectively based on conversations to/from the wireless host 205. For instance, if wireless host 205 was in communication with other wired or wireless hosts 225, embodiments of the present disclosure may update those distribution switches which have the host 225 connected as to the new routing information associated with wireless host 205. To determine which of the wireless hosts 225 were in communication with wireless host 205 prior to the roaming, netflow tables may be accessed through the previous access switch 210a.

Knowing which wireless hosts were in communication with wireless host 205, their corresponding distribution switches may be fetched and updated with the new routing information associated with wireless host 205. This may be done, for example, using the {distribution switch—access switch} binding formation described above. In various embodiments, this information may be pushed to LISP map server 220 on a periodic basis to ensure a faster detection and update of these wireless hosts.

Figure 3:
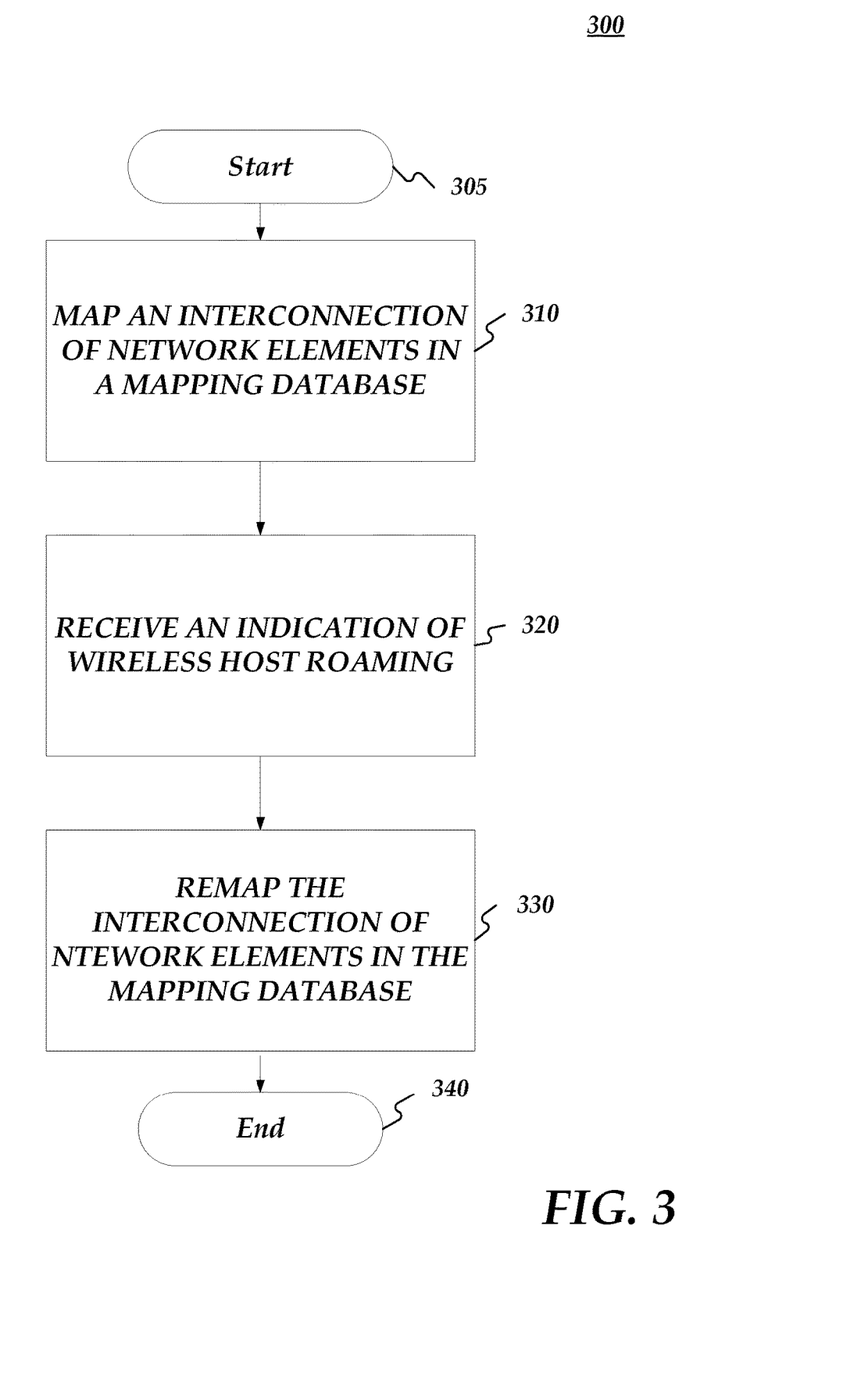
FIG. 3 is a flow chart of a method for accelerating network convergence.

FIG. 3 is a flow chart setting forth the general stages involved in a method 300 consistent with an embodiment of the disclosure for accelerating network convergence. Method 300 may be implemented by, for example, a LISP mapping server 220 as described in more detail below with respect to FIG. 4. Ways to implement the stages of method 300 will be described in greater detail below.

Method 300 may begin at starting block 305 and proceed to stage 310 where LISP mapping server 220 may map an interconnection of network elements in a mapping database. For example, mapping server 220 may be connected to a NGWC network integrated with campus LISP architecture. As mentioned with references to FIGS. 1 and 2, such network may comprises access switches (e.g., wireless routers), distribution switches (e.g., Layer 3 gateway switches), and core switches. In addition, mapping server 220 may be in operative communication with MC 215.

Mapping server 220 may register the access switches as end points in its mapping database and then map ties with the distribution switches that are connected to those endpoints. In this way, mapping server 220 may have a database of the interconnections between the access switches and distribution switches.

From stage 310, where LISP mapping server 220 maps the interconnection of network elements, method 300 may advance to stage 320 where mapping server 220 may receive an indication that wireless host 205 has switched access point connections. The indication may be provided from MC 215. As mentioned above, MC 215 may track the location of wireless host 205. When MC 215 detects that wireless host 205 has connected to a new access point, MC 215 may notify mapping server 220. The notification provided to mapping server 220 may be in the form of a message comprising host MAC and IP address as well as the address and credentials of the newly connected switch and corresponding VLAN. Mapping server 220 may form {Wireless Host—Access Switch—VLAN} binding based on the notification from MC 215.

MC 215 may detect the wireless host 205 connection to the new access point via a mobility agent attached to the new access point. Consistent with embodiments of the present disclosure, each access point may be in operative communication with a corresponding mobility agent. Once the mobility agent detects that a new host connection to its corresponding access point, it may provide MC 215 with an indication of the new connection. The indication may comprise the information need for MC 215 to establish the {Wireless Host—Access Switch—VLAN} binding.

Once computing device received the access point switch indication in stage 320, method 300 may continue to stage 330 where mapping server 220 may remap the mapping database to reflect the new {Wireless Host—Access Switch—VLAN} binding. Consistent with embodiments of the disclosure, mapping server may register a wireless endpoint ID associated with the access switch reflected in the binding. Then, mapping server 220 may then look up the one or more distribution switches tied the access switch. This look up may be performed recursively until all of the distribution switches in connection with the access switch are determined. Once the distribution switches have been determined, mapping server 220 may form a {Access Switch—Distribution Switch} binding.

Having the {Wireless Host—Access Switch—VLAN} binding and the {Access Switch—Distribution Switch} binding, mapping server 220 may configure the routing associated with those distribution switches to correspond to the wireless endpoint ID of the wireless host. In this way, network traffic may be directed to the new distribution switches associated with the access switch in an accelerated manner without the extraneous "hair pin tunneling" problems associated with previous solutions. Once mapping server 220 {Wireless Host—Access Switch—VLAN} in stage 340, method 300 may then end at stage 350.

An embodiment consistent with the disclosure may comprise a network comprising a core switch; at least two access switches; at least one distribution switch positioned between the core switch and the at least two access switches; a wireless host configured to: connect to a first one of the at least to access switches, disconnect from the first access switch, and reconnect to a second one of the at least two access switches; a mobility controller configured to: monitor the wireless hosts location, and update a mapping server with the wireless hosts location; and a mapping server configured to: register the at least two access switches as endpoints within a mapping database, associate the access switches with attached distribution switches, receive location information from the mobility controller, look up at least one distribution switch associated with the wireless host, tie the at least one distribution switch with a wireless endpoint ID, and update network traffic routing information associated with the at least one distribution switch and the wireless endpoint ID.

Another embodiment consistent with the disclosure may comprise a system for accelerating network convergence. The system may comprise a memory storage and a processing unit coupled to the memory storage. The processing unit may be operative to map an interconnection of network elements comprising at least the following: a wireless host, at least two access switches, a plurality of distribution switches, a core switch, a mobility controller, and a mapping database; receive an indication that the wireless host has disconnected from a first access switch and connected to a second access switch; remap the interconnection of network elements in response to the received indication; registering a wireless endpoint ID associated with the wireless host with the second access switch in the mapping database; look up one or more distribution switches in the mapping database tied to the second access switch; and update the one or more distribution switches with new endpoint routing information associated with the wireless endpoint ID.

Figure 4:
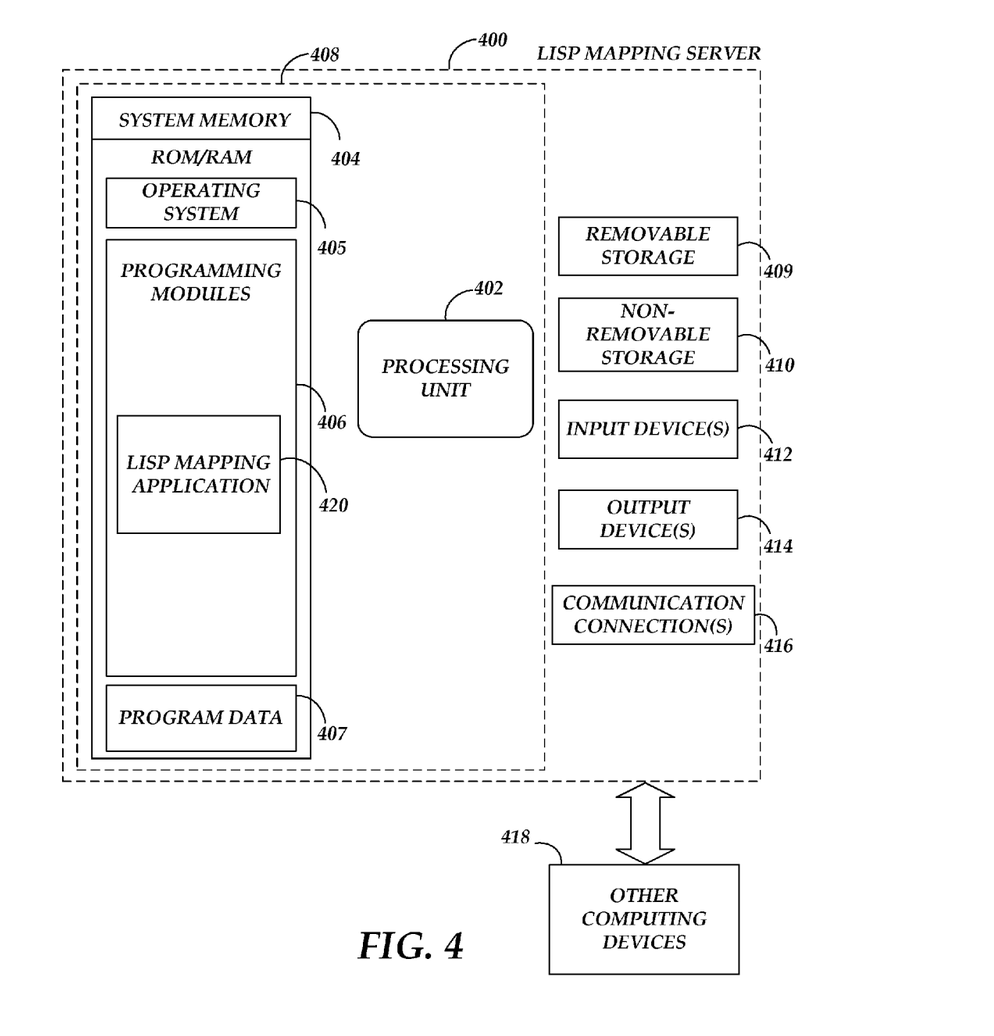
FIG. 4 is a block diagram of a system including a LISP mapping server.

FIG. 4 is a block diagram of a system including computing device 400. Consistent with an embodiment of the disclosure, the LISP Mapping Server 220 may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the disclosure. Furthermore, computing device 400 may comprise an operating environment for system 100 as described above. System 100 may operate in other environments and is not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, LISP mapping database 420. Furthermore, embodiments of the disclosure may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. LISP Mapping Database 420) may perform processes including, for example, one or more method 300's stages as described above. The aforementioned process is an example, and processing unit 402 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

We claim:

1. A method comprising:
   creating an interconnection map of network elements comprising at least the following: a wireless host, at least two access switches, a plurality of distribution switches, a core switch, a mobility controller, and a mapping database, wherein the at least two access switches are endpoints in the interconnection map, wherein creating the interconnection map comprises tying each of the at least two access switches to at least one of the plurality of distribution switches, and wherein the at least one of the plurality of distribution switches are positioned between the core switch and each of the at least two access switches in the interconnection map;

receiving an indication that the wireless host has disconnected from a first access switch and connected to a second access switch, wherein the first access switch is associated with a first virtual local area network (VLAN) and a first distribution switch;

reconfiguring a network between the at least two access switches, the plurality of distribution switches, and the core switch to support mobility handoff, wherein reconfiguring the network comprises:

registering a wireless endpoint ID (El D) associated with the wireless host with the second access switch in the mapping database;

creating a first binding between the wireless host, the second access switch, and a second VLAN associated with the second access switch, wherein creating the first binding further comprises carrying internet protocol (IP) address of the wireless host from the first VLAN to the second VLAN;

determining one or more distribution switches from the mapping database tied to the second access switch; and creating a second binding between the second access switch and the determined one or more distribution switches, wherein creating the second binding comprises associating the EID with the one or more distribution switches and configuring routing associated with the one or more distribution switches to correspond to the EID and pointing to the second VLAN, wherein creating the second binding further comprises clearing a previous routing associated with the EID; and routing a network traffic for the wireless host based on new endpoint routing information comprising the first binding and the second binding associated with the wireless endpoint ID.

2. The method of claim 1, wherein creating the interconnection map of network elements comprises:

registering the at least two access switches as endpoints within the mapping database, and associating each of the at least two access switches with at least one of the plurality of distribution switches.

3. The method of claim 1, wherein determining the one or more distribution switches in the mapping database comprises recursively looking through the mapping database to determine all of the distribution switches associated with the second access switch.

4. The method of claim 1, wherein determining the one or more distribution switches in the mapping database comprises determining which other wireless hosts are in communication with the wireless host and looking up at least one distribution switch corresponding to the other wireless hosts.

5. The method of claim 4, further comprising updating the at least one distribution switch corresponding to the other wireless hosts with the new endpoint routing information.

6. The method of claim 1, wherein determining the associated one or more distribution switches in the mapping database comprises looking up one or more Layer 3 gateway switches in communication with the second access switch.

7. The method of claim 1, wherein receiving the indication that the wireless host has disconnected from the first access switch and connected to the second access switch comprises receiving the indication from the mobility controller.

8. The method of claim 7, wherein receiving the indication from the mobility controller comprises receiving at least one of the following: a wireless host MAC address, a wireless host IP address, a VLAN associated with the wireless host, and an access switch IP address.

9. The method of claim 1, wherein routing the network traffic based on the new endpoint routing information comprises rerouting the network traffic from the first distribution switch in communication with the first access switch to the determined one or more distribution switches in communication with the second access switch.

10. The method of claim 9, wherein rerouting the network traffic from the first distribution switch in communication with the first access switch to the determined one or more distribution switches in communication with the second access switch comprises:

clearing routing information associated with the first distribution switch and the first access switch, and configuring the one or more distribution switches for communication with the second access switch.

11. The method of claim 1, further comprising updating the interconnection map, wherein updating the interconnection map comprises periodically updating the interconnection map with the new endpoint routing information.

12. The method of claim 1, wherein receiving the indication that the wireless host has disconnected from the first access switch and connected to the second access switch comprises receiving an indication that a wireless device has connected to a new wireless router.

13. A network comprising:

a core switch;

at least two access switches;

a plurality of distribution switches positioned between the core switch and the at least two access switches;

a wireless host configured to:
connect to a first access switch of the at least two access switches,
disconnect from the first access switch, wherein the first access switch is associated with a first virtual local area network (VLAN) and a first distribution switch, and
reconnect to a second access switch of the at least two access switches;

a mobility controller configured to:
monitor a wireless host location, and
update a mapping server with the wireless host location; and a server configured to:
reconfigure a network between the at least two access switches, the plurality of distribution switches, and the core switch to support mobility handoff, wherein the server being configured to reconfigure the network comprises the server being configured to:
register a wireless endpoint ID (EID) associated with the wireless host with the second access switch in the mapping database,
receive the wireless host location from the mobility controller,
determine at least one distribution switch associated with the second access switch,
create a first binding between the wireless host, the second access switch, and a second VLAN associated with the second access switch, wherein creating the first binding further comprises carrying internet protocol (IP) address of the wireless host from the first VLAN to the second VLAN, create a second binding between the second access switch and the determined at least one distribution switch, wherein creating the second binding comprises associating the EID with the one or more distribution switches and configuring routing associated with the one or more distribution switches to correspond to the EID and pointing to the second VLAN, wherein creating the second binding further comprises clearing a previous routing associated with the EID, and route network traffic for the wireless host based on new endpoint routing information comprising the first binding and the second binding associated with the wireless endpoint ID.

14. The network of claim 13, wherein each of the at least two access switches are associated with a VLAN.

15. The network of claim 14, wherein when the wireless host reconnects to the second access switch, the wireless host connects to the second VLAN.

16. The network of claim 14, wherein the mobility controller is configured to monitor the wireless host location in terms of at least one of the following:

a wireless host MAC address, a wireless host IP address, a VLAN associated with the wireless host, and an access switch IP address.

17. A method comprising:

creating an interconnection map of network elements comprising at least the following: a wireless host, at least two access switches, a plurality of distribution switches, a core switch, a mobility controller, and a mapping database;

registering the at least two access switches as endpoints within the mapping database;

associating each of the at least two access switches with at least one of the plurality of distribution switches;

receiving an indication that the wireless host has disconnected from a first access switch associated with a first virtual local area network (VLAN) and connected to a second access switch associated with a second VLAN;

reconfiguring, in response to receiving the indication, a network between the at least two access switches, the plurality of distribution switches, and the core switch to support mobility handoff, wherein reconfiguring the network comprises:

registering a wireless endpoint ID (EID) associated with the wireless host with the second access switch in the mapping database;

determining one or more distribution switches in the mapping database tied to the second access switch;

creating a first binding between the wireless host, the second access switch, and a second VLAN associated with the second access switch, wherein creating the first binding further comprises carrying internet protocol (IP) address of the wireless host from the first VLAN to the second VLAN;

creating a second binding between the second access switch and the determined at least one distribution switch, wherein creating the second binding comprises associating the EID with the one or more distribution switches and configuring routing associated with the one or more distribution switches to correspond to the EID and pointing to the second VLAN, wherein creating the second binding further comprises clearing a previous routing associated with the EID; and routing network traffic for the wireless host based on new endpoint routing information comprising the first binding and the second binding associated with the wireless endpoint ID.

18. The method of claim 17, wherein receiving the indication that the wireless host has disconnected from the first access switch and connected to the second access switch comprises receiving an indication that the wireless host has disconnected from the first VLAN and reconnected to the second VLAN.

19. The method of claim 17, wherein receiving the indication that the wireless host has disconnected from the first access switch and connected to the second access switch comprises receiving the indication from the mobility controller.

20. The method of claim 17, wherein routing the network traffic with the new endpoint routing information comprises rerouting the network traffic from at least one pervious distribution switch in communication with the first access switch to at least one current distribution switch in communication with the second access switch.

* * * * *